United States Patent [19]
Egawa et al.

[11] Patent Number: 4,706,252
[45] Date of Patent: Nov. 10, 1987

[54] LASER DEVICE OF AC DISCHARGE EXCITATION TYPE

[75] Inventors: Akira Egawa, Hiratsuka; Ryoichi Noudomi, Fujisawa, both of Japan

[73] Assignee: Kabushiki Kaisha Komatsu Seisakusho, Tokyo, Japan

[21] Appl. No.: 765,862

[22] Filed: Aug. 14, 1985

[51] Int. Cl.$^4$ .......................... H01S 3/00; H05B 41/14
[52] U.S. Cl. ........................................ 372/38; 315/208
[58] Field of Search ............. 372/38; 315/208, 241 R, 315/243

[56] References Cited
U.S. PATENT DOCUMENTS
4,276,497  6/1981  Burbeck et al. ................. 372/38

FOREIGN PATENT DOCUMENTS
9236  2/1982  Japan .

Primary Examiner—Gene Wan
Attorney, Agent, or Firm—Spensley Horn Jubas & Lubitz

[57] ABSTRACT

A laser device in which an output of a switching circuit for DC/AC conversion is applied through a filter to discharge electrodes to generate an AC discharge therebetween to use it as a laser exciting source.

13 Claims, 10 Drawing Figures

LASER DEVICE OF AC DISCHARGE EXCITATION TYPE

BACKGROUND OF THE INVENTION

1. Field of the Invention

The present invention relates to a laser device in which an AC discharge between opposing electrodes is used as a laser exciting source, and more specifically, to an improvement in supplying discharge power to the electrodes in a laser device.

2. Description of the Prior Art

In a conventional laser device, an AC voltage outputted from a switching circuit (inverter) for DC/AC conversion is applied to opposing discharge electrodes of a laser oscillator to generate an AC discharge therebetween to use it as a laser exciting source.

However, such a conventional laser device has disadvantages in the following respects because the AC voltage applied from the switching circuit to the discharge electrodes has a square or the similar waveform.

(a) Since a discharge current caused by the AC square-waveform voltage contains harmonic components of large amplitude, the laser device produces a high level high frequency noise (harmonic noise) during discharging operation.

(b) Since the discharge part is a capacitive load, the concentrated discharge current flows during a short rise time of the square-waveform voltage and thus the discharge current has a high peak value, which disadvantageously results in that the discharge electrodes are likely to be damaged and switching elements and diodes for protection of these elements in the switching circuit are quickly deteriorated.

(c) The discharge current having a high peak value strongly tends to cause a discharge transition, thus lowering an oscillation efficiency.

The discharge transition means a transfer of the mode of discharge from glow discharge to other modes such as arc discharge having a very high current density. When such transition takes place, most of the discharge power is consumed for raising the temperature of a laser medium gas, whereby the excitation efficiency is greatly reduced and the oscillation is sometimes disabled.

SUMMARY OF THE INVENTION

It is, therefore, a primary object of the present invention to provide a laser device of AC discharge excitation type which can eliminate the above problems in the prior art, that is, can reduce a harmonic noise caused by high harmonic component of the discharge current during discharging operation and prevent the damage of discharge electrodes and the discharge transition caused by a peak discharge current, with a high reliability and a good output efficiency.

In accordance with the present invention, this object can be attained by a laser device in which an AC discharge is used as a laser exciting source and a filter is provided between discharge electrodes and a switching circuit for DC/AC conversion.

BRIEF DESCRIPTION OF THE DRAWINGS

In the accompanying drawings:

FIGS. 6 and 7 are other embodiments of the present invention; and

DETAILED DESCRIPTION OF PREFERRED EMBODIMENTS

Figure 1:
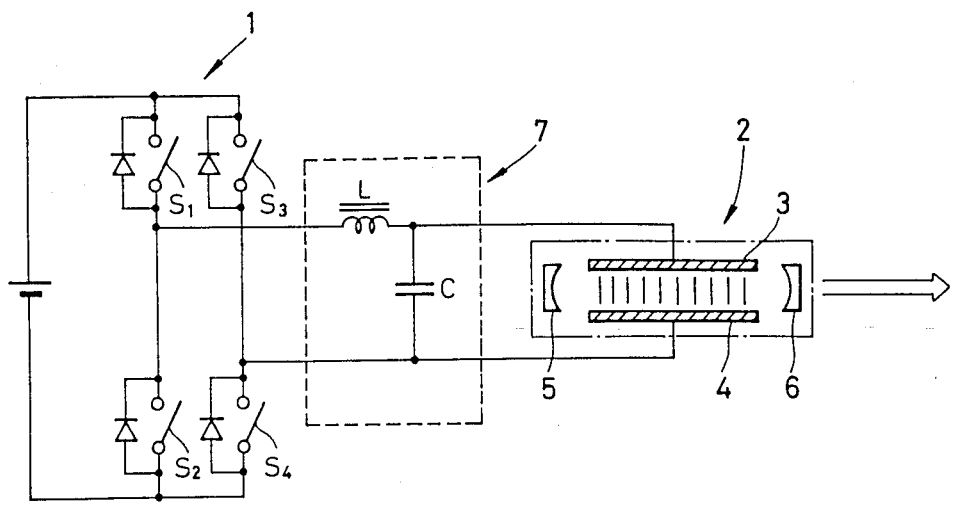
FIG. 1 is a circuit diagram of an embodiment of a laser device of AC discharge excitation type in accordance with the present invention.

Referring to FIG. 1, there is shown an embodiment of a laser device of AC discharge excitation type according to the present invention, in which an AC output voltage of a switching circuit 1 for DC-to-AC conversion is applied between two opposing discharge electrodes 3 and 4 of a laser oscillator 2 through a filter 7. The switching circuit 1 converts a DC voltage to an AC voltage by alternately opening and closing a pair of switching elements $S_1$ and $S_4$ and a pair of switching elements $S_2$ and $S_3$. The laser oscillator 2 further includes a totally reflecting mirror 5 and a partially transmitting or reflecting mirror 6 which are arranged as opposed to each other. In the laser oscillator 2, generation of a glow discharge between the discharge electrodes 3 and 4 will cause excitation of a laser medium gas enclosed within a discharge region. As a result, laser oscillation takes place between the fully and partially reflective mirrors 5 and 6 and some of the oscillated lights are emitted from the partially transmitting mirror 6 as a laser beam.

Assuming that f and $V_m$ are the frequency and crest or peak value of the AC square voltage as the output of the switching circuit 1 respectively, the AC voltage is expressed in the form of a series consisting of a fundamental wave and harmonics, as follows.

$$V(t) = \frac{4}{\pi} Vm \left( \sin 2\pi ft + \frac{1}{3} \sin 6\pi ft + \frac{1}{5} \sin 10\pi ft + \ldots \right) \quad (1)$$

$$\approx \frac{4}{\pi} Vm \sum_{n=1}^{\infty} \frac{1}{2n-1} \sin 2\pi(2n-1)ft$$

When such a square AC voltage is applied directly between the electrodes 3 and 4, harmonic components contained in the AC voltage will cause a harmonic noise during discharging operation, as earlier explained. In addition, the discharge current concentratedly flows during a short rise time of the AC voltage, so that the discharge current has a very large peak value, which not only causes such problems as the damage of the electrodes 3 and 4 and the fast deterioration of the switching elements $S_1$ to $S_4$ in the switching circuit 1 but also leads to the promotion of the discharge transition.

The harmonic noise and the peak value of the discharge current can be suppressed by sufficiently attenuating the third and higher harmonics in the equation (1). For this purpose, the filter 7 is used.

The filter 7 shown in FIG. 1 is a low pass filter which comprises a coil L and a capacitor C and has a cut-off frequency of between the frequency f of the AC output voltage of the switching circuit 1 and three times of the frequency f (that is, 3f). The output $v_f(t)$ of the filter 7 is substantially sinusoidal as shown by the following equation (2).

$$V_f(t) \simeq Vm \sin 2\pi ft \tag{2}$$

Figure 2:
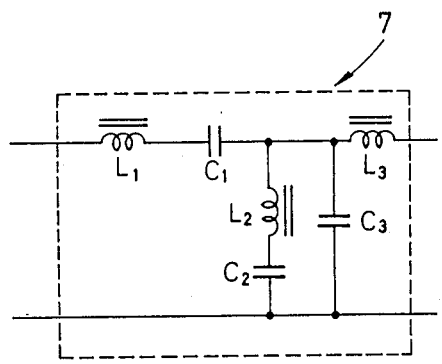
FIGS. 2 and 3 are circuit diagrams showing other different examples of a filter used in the laser device of FIG. 1.
Figure 3:
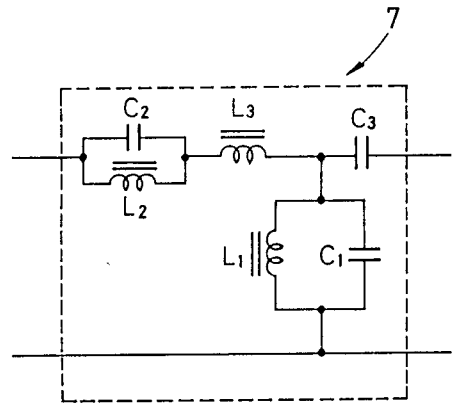

FIGS. 2 and 3 show other examples of the filter 7. More particularly, the filters 7 shown in FIGS. 2 and 3 form parallel and series resonance circuits which selectively pass only the fundamental wave respectively. That is, a coil $L_1$ and a capacitor $C_1$ are set to be tuned to the frequency f, while a coil $L_2$ and a capacitor $C_2$ are set to be tuned to the frequency of the third harmonic. Accordingly, the filters 7 of FIGS. 2 and 3 function as a band pass filter which has the frequency f of the fundamental wave as its center frequency.

In general, the impedance between the discharge electrodes 3 and 4 varies frequently, but such resonant band pass filters as shown in FIGS. 2 and 3 are advantageously less affected by the load variation.

Figure 4:
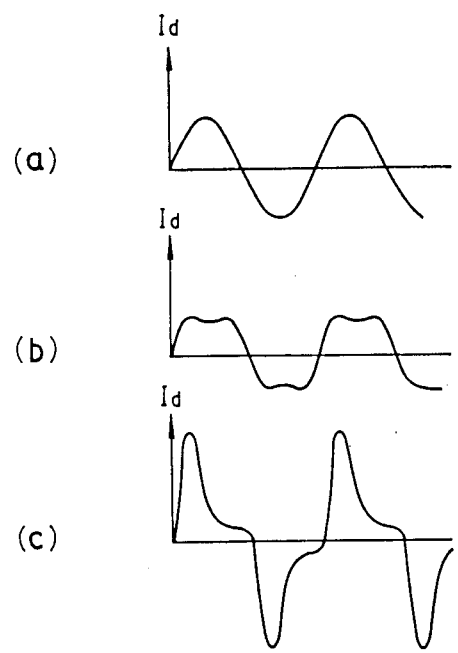
FIGS. 4a,b and c shows waveforms of discharge currents according to the present invention and the prior art.

According to the embodiments having the filters 7 shown in FIGS. 2 and 3, a sinusoidal discharge current $I_d$ shown in FIG. 4(a) will flow between the discharge electrodes 3 and 4, thus with the sinusoidal discharge current $I_d$, the generation of a harmonic noise caused by harmonic components in the square AC voltage can be prevented. As will be clear from the comparison between FIG. 4(a) of this embodiment and FIG. 4(c) of the prior art without any such filter, according to this embodiment, a large discharge current will not flow concentratedly during a short time, thereby preventing the damage of the electrodes 3 and 4 and deterioration of the switching elements $S_1$ to $S_4$ (for example, thyristors) and diodes of the switching circuit 1. In addition, the laser oscillation efficiency can be improved for the following reason.

Figure 5:
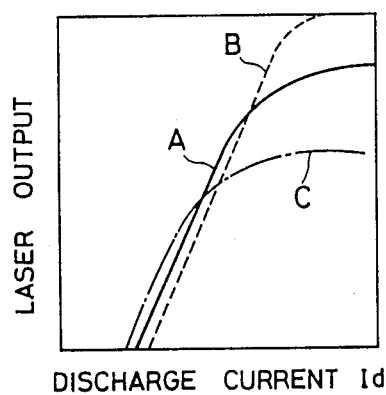
FIG. 5 is a graph showing a relationship between the discharge current and laser output in the present invention and prior art.

That is, this type of laser device generally tends to saturate its laser output when the discharge current $I_d$ exceeds a certain level as shown in FIG. 5. The saturation of the laser output depends on the magnitude of the instantaneous value of the discharge current. More specifically, when the instantaneous value exceeds a certain value determined by the velocity, composition, temperature, pressure, etc. of the laser medium gas, discharge transition will take place and thus the increase rate in the laser output will decrease.

If the discharge currents shown in FIGS. 4(a) and (c) have the same effective value, then the peak value of the former discharge current (a) will be smaller than that of the latter (c). Accordingly, the discharge transition is less likely to take place in the above embodiments than in the prior art. As a result, the laser oscillation efficiency can be improved, that is, a high laser output can be obtained.

Turning now to FIG. 5, reference symbols A and B denote discharge current vs. laser output characteristics according to the foregoing embodiment and prior art, respectively.

Referring again to FIG. 4, (b) shows the waveform of a discharge current when the filter 7 is designed to pass the second harmonic component or the second and third harmonic components of the square AC voltage. Since the current shown in FIG. 4(b) has the substantially trapezoidal waveform with the same effective value as the current shown in FIG. 4(a), the peak value of the current of FIG. 4(b) becomes smaller than that of FIG. 4(a). By making the discharge current in a trapezoidal waveform in this manner, the laser output can be further improved as shown by a characteristic curve B in FIG. 5.

The filter 7 shown in FIG. 1 may be designed to pass the second harmonic component or the second and third harmonic components of the square AC voltage by properly adjusting the values of the coil L and capacitor C to and providing a desired cut-off frequency to the filter 7. Similarly, the filters 7 shown in FIGS. 2 and 3 may be also designed to have the similar frequency characteristic by properly adjusting the values of the coil $L_1$ and capacitor $C_1$ and providing a desired central frequency to the respective filters.

Figure 6:
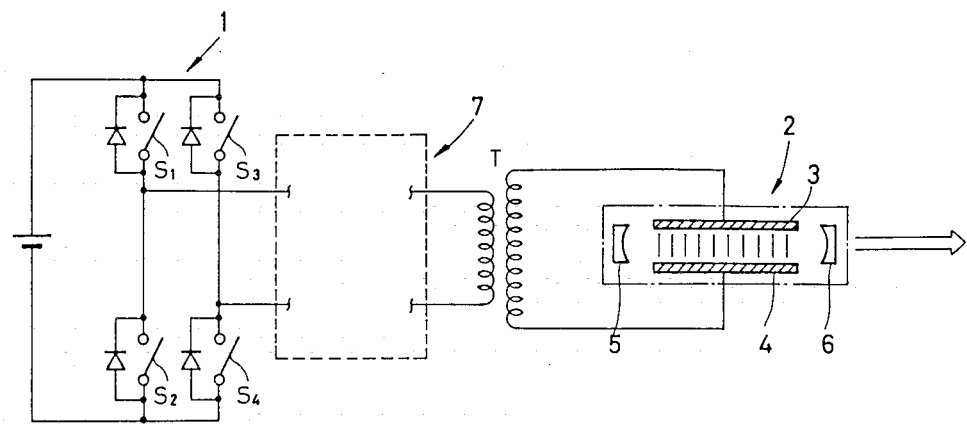
FIG. 6 is a circuit diagram of another embodiment of the laser device of the present invention.

The output of the switching circuit 1 is applied directly to the filter 7 in the above embodiment, but when a higher discharge voltage is necessary, a boosting transformer T may be provided between the filter 7 and electrodes 3 and 4 as shown in FIG. 6. The transformer T may be of course provided between the switching circuit 1 and filter 7.

In the above embodiment, the filter 7 is provided with capacitors. On the other hand, capacitance exists between the discharge electrodes during discharging operation. This capacitance may be utilized as the capacitor in the filter.

More particularly, the capacitor C of FIG. 1 may be replaced with the capacitance exist between the discharge electrodes B and C, thus the filter 7 can be constructed without the capacitor C being provided. In this case, the inductance of the coil L must be determined so that the filter 7 has a desired cut-off frequency. In the same manner, the capacitor $C_3$ of FIG. 2 and the capacitor $C_1$ of FIG. 3 can be replaced with the capacitance between the discharge electrodes.

Figure 7:
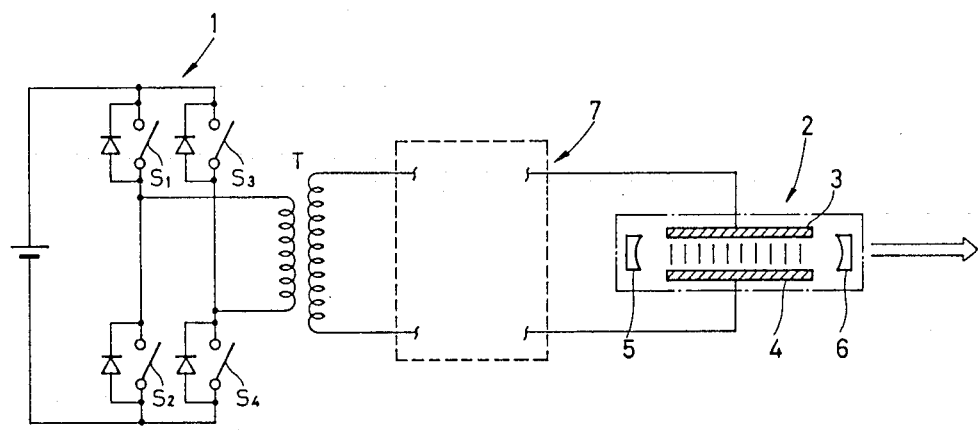

In the embodiments of FIGS. 6 and 7 where boosting transformer T is employed, the inductance of the transformer T may be utilized as the inductance for the filter 7. That is, a low pass filter equivalent to the filter 7 of FIG. 1 can be constructed by connecting a capacitor in parallel with the secondary winding of the transformer T.

Figure 8:
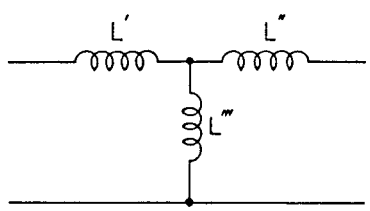
FIG. 8 is an equivalent circuit of the boosting transformer.

Further, since the transformer T can be equivalently expressed as a circuit shown in FIG. 8, coils L', L" and L''' of FIG. 8 may be functioned as the coils $L_1$, $L_2$ and $L_3$ of FIGS. 2 and 3.

Furthermore, both the capacitance between electrodes 3 and 4 and the inductance of the transformer T may be utilized as the elements of the filter. More particularly, the capacitor C and the coil L of the filter 7 in FIG. 1 can be replaced with these capacitance and inductance.

What is claimed is:

1. A laser device comprising a switching circuit for switching a direct current into an alternating current; a laser oscillator having a discharge electrode to which the alternating current outputted from said switching circuit is applied, wherein an alternating current discharge generated by said discharge electrode acts as a laser excitation source; and a frequency filter interposed between said switching circuit and said discharging electrode for making the wave shape of the discharge current flowing between said discharging electrodes either one of a sine curve and substantially a sine curve.

2. A laser device as set forth in claim 1, wherein said filter passes the fundamental and second harmonic frequencies of the switching circuit alternating current output.

3. A laser device as set forth in claim 1, wherein said filter passes substantially only the fundamental frequency of the switching circuit alternating current output.

4. A laser device as set forth in claim 1, wherein said filter is a low pass filter.

5. A laser device as set forth in claim 4, wherein said low pass filter has a cut-off frequency equal to the frequency of said switching circuit alternating current output or to a frequency between said switching circuit alternating current output frequency and triple the switching circuit alternating current output frequency.

6. A laser device as set forth in claim 1, wherein said filter is a resonant type filter.

7. A laser device as set forth in claim 6, wherein said filter has a center frequency equal to or close to the frequency of said switching circuit alternating current output.

8. A laser device as set forth in claim 1, wherein said filter is constructed by utilizing capacitance between said discharge electrodes.

9. A laser device as set forth in claim 1, further comprising a boosting transformer provided between said filter and switching circuit or between said filter and discharge electrodes.

10. A laser device as set forth in claim 9, wherein said filter is constructed by utilizing inductance of said boosting transformer.

11. A laser device as set forth in claim 9, wherein said filter is constructed by utilizing inductance of said boosting transformer and capacitance between said discharge electrodes.

12. A laser device comprising:
   a switching circuit for switching a direct current into an alternating current;
   a discharge electrode to which the alternating current outputted from said switching circuit is applied to produce a discharge current to induce lasing action; and
   an LC filter interposed between said switching circuit and said discharging electrode for filtering the output of the switching circuit, said filter having an effective induction and capacitance so that the switching circuit alternating current output is filtered to an extent which results in the discharge current having a substantially sinusoidal output at a frequency substantially equal to the fundamental frequency of the switching circuit alternating current output.

13. A laser device as set forth in claim 12, wherein said filter passes the fundamental, second and third harmonic frequencies of the switching circuit alternating current output.

* * * * *